No. 886,657. PATENTED MAY 5, 1908.
G. SORTEBERG.
DIRT DERRICK.
APPLICATION FILED DEC. 4, 1906.

UNITED STATES PATENT OFFICE.

GUTORM SORTEBERG, OF ROSALIA, WASHINGTON.

DIRT-DERRICK.

No. 886,657.  Specification of Letters Patent.  Patented May 5, 1908.

Application filed December 4, 1906. Serial No. 346,200.

*To all whom it may concern:*

Be it known that I, GUTORM SORTEBERG, a citizen of the United States, residing at Rosalia, in the county of Whitman and State of Washington, have invented certain new and useful Improvements in Dirt-Derricks, of which the following is a specification.

My invention relates to that class of dirt derricks, calculated to elevate or raise dirt from a cut or from a plane to and into a car, wagon, dumping-car or dump cart and in these respects I expect to fill a want yet unsupplied.

I am aware of other dirt derricks that convey dirt from a bank to a car or other transporting vehicle but am not aware of any of the character herein described, calculated to elevate dirt from a plane or cut and convey the same into a vehicle.

Figure 1:
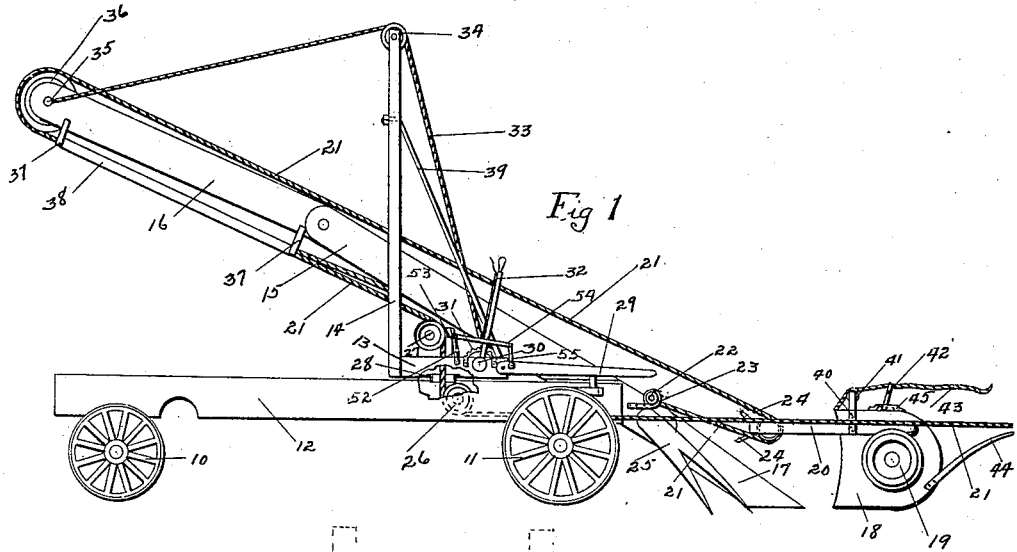
Figure 2:
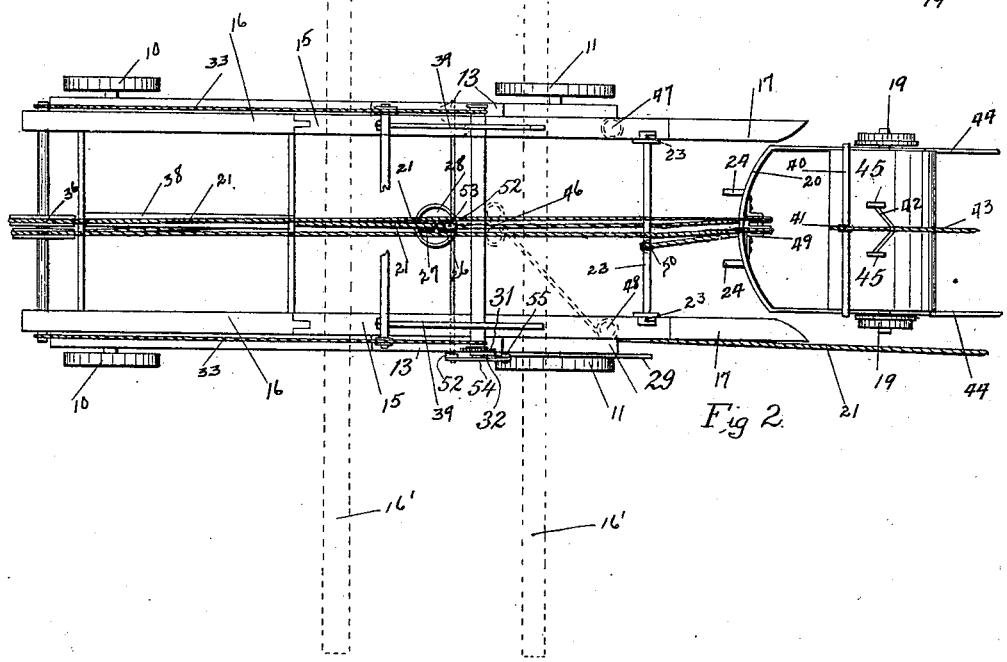

In the drawings, Figure 1 is a side elevation of the apparatus, complete, and Fig. 2 is a top plan view of the apparatus, complete.

My derrick is mounted on trucks 10 and 11 and is drawn along the ground without trackage the same as wagons or other vehicles. I construct the derrick near the back truck 11 of the vehicle, around a hollow pivot 28, the elevated portion 15, 16 and 17 of the derrick extending forward and upward; the highest and farthest front portion extending forward approximately above the forward truck 10. The derrick portion is hung on a pivot 28 in order that the elevated portion thereof may be swung around over the box of the conveyance desired to be filled or which is used to convey away the dirt. The dirt is loaded first into a scraper pail 18 drawn by a horse through the medium of a cable 21. The same power and cable serving also to elevate the loaded scraper pail which is drawn upwards on a track provided along the inclined plane of the elevated portion 15, 16 and 17 of the derrick.

The scraper pail 18 is provided with a wheel 19 on either side engaging the tracks as the elevation is effected. The scraping up of the dirt is done from the rear of the derrick and of the truck. The trackage on which the scraper pail loaded with dirt travels, extends to the ground, a pair of dogs 25 reaching from either side of the derrick extend backward and engage the surface of the earth to prevent the truck from being drawn backward by the draft necessary to load the scraper pail.

One end of the cable used to draw the scraper pail is secured to a cross-bar 22 reaching across the derrick and which follows the trackage of the scraper pail, always preceding the scraper pail in its ascent up the inclined plane portion of the derrick and succeeding it on its descent. This cross-bar serves to maintain the proper equilibrium of the scraper pail in its ascent and descent; the said cable then extends backward and around a block 49 at the center of the bail 20 of the scraper pail 18, thence forward and upward to the top part of the elevated portion of the derrick, there over a block 36 thence downward and backward over the block 49 at the center of the bail 20 of the scraper pail 18, thence forward and upward over the block 36 at the upper end of the elevated portion of the derrick, thence backward and over the pulley 27, thence downward to and through the hollow pivot 28 upon which the derrick is hung, thence downward over the pulley 27, thence backward over pulleys 46 and 47 or 46 and 48 to a point beyond and in the rear of the scraper pail to where a horse is hitched. The horse furnishes the motive power to elevate the loaded scraper pail. When the scraper pail is elevated to the proper height the man operating the derrick seizes a lever or handle 29 at the side of and near the rear of the derrick, forces the back end of the derrick around from the conveyance to be loaded, the derrick revolving on its pivot 28 and the elevated portion of the derrick being forced over the conveyance to be loaded; the operator then draws the rope 43 secured to the top portion of the scraper pail 18, which effects a tripping and dumping of the pail; the derrick portion is then thrown back parallel with the truck, the cable 21 slackened and the scraper pail allowed to drop down along its trackage to the ground for reloading.

In order to regulate the descent of the scraper pail I have provided a friction brake 53 operated by the hand lever 29 and working against the cable 21 as it passes over the pulley 27. I raise and lower the elevated portion of the derrick by means of a lever 32 operating a cable 33 extending over a standard 14 and the pulley 34 and attached to the elevated end of the derrick. An inverted trough 38 is provided and attached to the under side of the elevated portion of the derrick, through which the cable 21 drawing the scraper pail 18 passes, calculated to protect its operations from the falling dirt when the scraper pail is tripped.

The scraper pail is so constructed that the tripping device can be attached to either surface, the pail inverted and both surfaces worn out before it is necessary to replace the same. The tripping device is effected by securing the tripping rope 43 to the top of the scraper pail at the front edge thereof, thence passing the same over the pulley 41, thence over and secured to the inverted V shaped rack 42 secured loosely in the sockets 45 at either end to the top portion of the scraper pail, so that the rack 42 may rotate backward and forward, the rack 42 resting horizontally of the top of the pail and rearwardly of the sockets 45 as the pail starts to ascend its track up the inclined surface of the elevated portion of the derrick and is thrown upward and forward by a jerk of the rope 43, thereby giving slack to the rope 43 sufficient to allow the top of the pail to tip downwardly sufficiently to empty the same. A draw on the rope 43 again, will set the inverted V shaped member again horizontally of the top of the pail, rearwardly of the sockets 45 thereby re-setting the pail again for loading and subsequent tripping; however, any suitable means of tripping the pail may be used.

12 indicates the truck frame, 13 a portion of the derrick frame.

23 indicates hooks to prevent the cross-bar 22 from dropping farther down the incline.

24 are guides operating against the cross-bar 22 and serving to maintain and steady the bail 20.

30 is a shaft for lever 32, and 31 a keeper for the lever 32.

35 is the shaft carrying the block 36.

37 are braces securing inverted trough 38 to the elevated parts 16.

39 is a brace for the standard 14.

41 is a standard carrying the rope 43.

44 is a handle to scraper pail 18.

45 are sockets in which inverted V shaped brace 42 rotates.

50 indicates the tied end of cable 21.

52, 54 and 55 are rods serving as connecting parts of lever 29 and friction brake 53.

The dotted lines 16' indicate the position of the derrick portion when in a position to dump a load of dirt from the scraper pail 18.

Having thus described my invention, what I claim as new and useful and desire to secure by Letters Patent is:—

1. In a derrick for loading dirt into cars, wagons, dump cars or dump carts the combination of a truck bearing a derrick frame composed of two parallel sides in sections, reaching from the ground at the rear of the truck and extending forward and upward on an angle to a point approximately over or a little beyond the forward wheels of the said truck, the said parallel sides being joined together at the tops thereof by a shaft bearing at its center portion a double block for carrying a cable, an inverted trough secured to the said parallel sides, subjacent thereto and longitudinally therewith and midway between them, an upright secured to the frame below and braced to a position at right angles to the body of the truck with a cable passing over its upper end and over a pulley there provided and extending to and being secured at one end to the upper end of the said parallel sides and at the other end extending downward and backward and secured to a shaft rotated by a lever, the whole of said parallel sides arrangement, upright, brace, trough, lever and other attachments being secured to a frame and the said frame secured to a truck by a hollow pivot, the whole thereof being borne by a truck, substantially as set forth.

2. In a derrick for loading dirt into cars, wagons, dump cars and dump carts, the combination of two parallel side boards in sections reaching from the ground at the rear of a truck forward and upward to a point approximately over or a little beyond the forward wheels of such truck, a cable passing over a double block at the front end of such side boards, one end of such cable extending downward and backward over a system of pulleys and through a hollow pivot in the platform of the truck thence backwards and to the rear of such truck, the other end of such cable passing backward and downward over a double block secured to the bail of a scraper pail, thence forward and tied to a cross rod extending from side to side of the said parallel side boards, the said cross rod resting in hooks secured to such side boards, substantially as set forth.

3. In a dirt derrick for the purpose of elevating dirt from a plane or cut to a car, wagon, dump car or dump cart, the combination of two parallel side boards arranged to form an inclined plane, reaching from the ground in the rear of a truck, forward and onto the truck and secured thereon by a hollow pivot, thence extending forward and upward to a point near the front wheels of such truck, said side boards having a top surface suitable for carrying a pair of wheels, a scraper pail with a wheel on either side thereof, arranged to engage the top surface of the said side boards, substantially as set forth.

4. In a dirt derrick of the character mentioned, a frame arranged on an incline, borne by a truck, such frame arranged for carrying a pail with wheels engaging such frame and drawn by a cable operating over pulleys, a lever and a friction brake arranged at one side of such frame and engaging such cable as it passes over a pulley in the descent of the pail, substantially as set forth.

In testimony whereof I affix my signature, in presence of two witnesses.

GUTORM SORTEBERG.

Witnesses:
L. L. WESTFALL,
W. R. SAMPSON.